(12) United States Patent
Gipson (10) Patent No.: US 10,506,795 B2
(45) Date of Patent: Dec. 17, 2019

(54) PRACTICE APPARATUS FOR EQUINE BARREL RACING

(71) Applicant: Tommie C. Gipson, Eaton, CO (US)

(72) Inventor: Tommie C. Gipson, Eaton, CO (US)

( * ) Notice: Subject to any disclaimer, the term of this patent is extended or adjusted under 35 U.S.C. 154(b) by 0 days.

(21) Appl. No.: 16/368,438

(22) Filed: Mar. 28, 2019

(65) Prior Publication Data

US 2019/0343079 A1    Nov. 14, 2019

Related U.S. Application Data

(60) Provisional application No. 62/668,686, filed on May 8, 2018.

(51) Int. Cl.
*A01K 15/02* (2006.01)
*F16M 13/02* (2006.01)

(52) U.S. Cl.
CPC ......... *A01K 15/027* (2013.01); *F16M 13/022* (2013.01)

(58) Field of Classification Search
CPC ...... A01K 15/027; A01K 15/02; A63K 3/046; B65D 7/045
See application file for complete search history.

(56) References Cited

U.S. PATENT DOCUMENTS

| 2,224,632 | A | * | 12/1940 | Giles | B65D 7/045 165/136 |
|---|---|---|---|---|---|
| 7,870,838 | B2 | | 1/2011 | Madsen | |
| 8,256,383 | B2 | | 9/2012 | Madsen | |
| 9,943,070 | B1 | * | 4/2018 | Allen | A01K 15/027 |
| 2005/0120971 | A1 | | 6/2005 | Fuller | |
| 2005/0139166 | A1 | | 6/2005 | Madsen | |
| 2009/0050074 | A1 | * | 2/2009 | Molder | A01K 15/027 119/712 |
| 2011/0088633 | A1 | | 4/2011 | Madsen | |
| 2012/0304941 | A1 | * | 12/2012 | Marold | A01K 15/02 119/719 |
| 2015/0053685 | A1 | | 2/2015 | Sievers | |
| 2019/0005778 | A1 | * | 1/2019 | Beers, II | G07F 17/3288 |

FOREIGN PATENT DOCUMENTS

DE            3533406 A1 *  3/1987  ............ B65D 7/045

* cited by examiner

*Primary Examiner* — Magdalena Topolski
(74) *Attorney, Agent, or Firm* — Elizabeth R. Hall & Associates, P.C; Elizabeth R. Hall (57) ABSTRACT

A practice apparatus for use in training a horse and rider for equine barrel racing. The practice apparatus is a barrel that uprights itself when tilted from a vertical position toward a horizontal position. The barrel has an internal assembly with a stretchable section that connects the barrel to a ground loop. This stretchable section allows for limited stretching of the internal assembly when the barrel is tilted whenever it is hit by a horse or its rider during practice.

17 Claims, 7 Drawing Sheets

PRACTICE APPARATUS FOR EQUINE BARREL RACING

CROSS-REFERENCE TO RELATED APPLICATION

The present application, pursuant to 35 U.S.C. 111(b), claims the benefit of the earlier filing date of provisional application Ser. No. 62/668,686 filed May 8, 2018 and entitled "Uprightable Barrel for Equine Barrel Racing."

BACKGROUND OF THE INVENTION

Field of the Invention

The present invention relates to a barrel racing practice apparatus that will upright itself when tilted from a vertical position toward a horizontal position. The barrel has an internal assembly with a stretchable section that connects the barrel to a ground assembly.

Description of the Related Art

Rodeo contests have become popular in recent years, particularly in the western states of the United States and Canada. Barrel racing is a popular rodeo event in which a horse and rider attempt to complete a cloverleaf pattern around preset barrels (typically placed in a triangle in the center of an arena) in the fastest time. There are currently over 800 sanctioned tour events with an annual payout of more than three million dollars.

Barrel racing combines the athletic ability and skill of both a horse and its rider to safely maneuver the horse around three preset barrels. The athleticism required for this maneuvering comes from optimum physical fitness of the rider and especially the horse. Adept riders will maneuver the horse as close to each barrel as possible to reduce the running time of the course. When pushing a horse to maximize its performance, either the rider or her horse will often contact the barrel. Since regulation barrels are made of metal and are very heavy, it is not unusual for contact with the barrel to injure a rider or her horse's leg.

Thus, proper preparation and training of the horse and rider team is critically important. Training generally includes multiple runs on a practice course to instill timing and maneuverability by the horse and rider team in running the course. In competition running past a barrel and off the pattern will result in a "no time" score and disqualification. In addition, if a barrel racer or her horse hits a barrel and knocks it over there is a time penalty of five seconds or more, which will generally rob the horse/rider team of any chance at a win. A rider/horse team can benefit from maximizing the number of practice runs within a practice session. Using regulation metallic barrels in practice sessions can often lead to injury, or if a barrel is knocked over the dismounted rider or an assistant must walk over to the barrel and upright the barrel in the proper position. This takes time and limits the runs that can be made in a practice session.

A need exists for a barrel that will upright itself and will not require a human to go out into the practice area to upright the barrel.

SUMMARY OF THE INVENTION

Embodiments of the present invention provide a practice apparatus or an automatically uprightable barrel for use in training for equine barrel racing. The uprightable barrel uprights itself when tilted from a vertical position toward a horizontal position. The barrel has an internal stretchable assembly that connects the barrel to a flexible ground loop. This stretchable section allows for limited stretching of the internal assembly when the barrel is tilted whenever it is hit by a horse or its rider during practice. Once the tilting force on the barrel is released, the tilted barrel is pulled back into its original vertical position by the retraction of the stretched section to its original configuration.

One embodiment of the present invention includes a barrel racing practice apparatus comprising a barrel having a top opening and an opposed bottom opening; a cross-bar that transverses a diameter of the barrel proximal the top opening; an attachment mechanism; an internal assembly connecting the cross-bar to the attachment mechanism, wherein the internal assembly includes a stretchable section; and a length adjustment mechanism that selectably adjusts a distance between the cross-bar and the attachment mechanism.

Another embodiment of the present invention includes a barrel racing practice apparatus comprising: a barrel having a top side with a top opening and a bottom side with a bottom opening; a cross-bar that transverses a diameter of the barrel proximal to the top opening; and an internal assembly having a belt reversibly mounted on the cross-bar with a length adjustment mechanism attached to the belt, at a first end to the belt, and an attachment mechanism attached to a second end of the stretchable section facing the bottom opening.

a. selecting a site of installation for the practice apparatus in the practice area;
    b. burying an anchor portion of a ground device at the selected site to allow a flexible portion of the ground device to protrude upward from the ground;
    c. placing the practice apparatus at the selected site, wherein the practice apparatus comprises
        (i) a barrel having a top opening and an opposed bottom opening,
        (ii) a cross-bar that transverses a diameter of the barrel proximal the top opening,
        (iii) an attachment mechanism,
        (iv) an internal assembly connecting the cross-bar to the attachment mechanism, wherein the internal assembly includes a stretchable section, and
        (v) a length adjustment mechanism that selectably adjusts a distance between the cross-bar and the attachment mechanism;
    d. reaching into the top opening of the barrel to adjusts the distance from the cross-bar to the attachment mechanism;
    e. reaching into the bottom opening to grasp the attachment mechanism;
    f. pulling the attachment mechanism through the bottom opening; and
    g. attaching the attachment mechanism to the flexible portion of the ground device.

Yet another embodiment of the present invention includes a method for installing a barrel racing practice apparatus in a practice area comprising: (a) selecting a site of installation for the practice apparatus in the practice area; (b) burying an anchor portion of a ground device at the selected site to allow a flexible portion of the ground device to protrude upward from the ground; (c) placing the practice apparatus at the selected site, wherein the practice apparatus comprises a barrel having a top opening and an opposed bottom opening, a cross-bar that transverses a diameter of the barrel proximal the top opening, an attachment mechanism, an internal assembly connecting the cross-bar to the attachment mechanism, wherein the internal assembly includes a stretchable section, and a length adjustment mechanism that selectably adjusts a distance between the cross-bar and the attachment mechanism; (d) reaching into the top opening of the barrel to adjusts the distance from the cross-bar to the attachment mechanism; (e) reaching into the bottom opening to grasp the attachment mechanism; (f) pulling the attachment mechanism through the bottom opening; and (g) attaching the attachment mechanism to the flexible portion of the ground device.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Embodiments of the present invention provide a barrel racing practice apparatus for use in training for equine barrel racing. One embodiment of the practice apparatus 50, shown in FIG. 1, includes a barrel having a top opening and an opposed bottom opening; a cross-bar that transverses a diameter of the barrel proximal the top opening; an attachment mechanism; an internal assembly connecting the cross-bar to the attachment mechanism, wherein the internal assembly includes a stretchable section; and a length adjustment mechanism that selectably adjusts a distance between the cross-bar and the attachment mechanism. The practice apparatus is used in coordination with a ground device or ground assembly having one end buried in the ground and an opposed second end protruding upward from the ground, wherein the attachment mechanism is selectably attachable through the bottom opening to the second end of the ground assembly.

When the apparatus is installed in a practice arena the barrel uprights itself when tilted from a vertical position toward a horizontal position. The barrel has an internal elastomeric assembly that is both stretchable and adjustable in length. The internal elastomeric assembly tethers the barrel to the ground device. This internal elastomeric assembly allows for limited stretching of the internal assembly when the barrel is tilted when it is hit by a horse or its rider during practice. Once the force on the barrel is released, the tilted barrel is pulled back to its original vertical position by the refraction of the internal assembly to its original configuration.

It is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in any appropriately detailed structure.

Referring now to the drawings, it is pointed out that like reference characters designate like or similar parts throughout the drawings. The Figures, or drawings, are not intended to be to scale. For example, purely for the sake of greater clarity in the drawings, component size and spacing are not dimensioned as they actually exist in the assembled embodiment.

The Barrel

Figure 1:
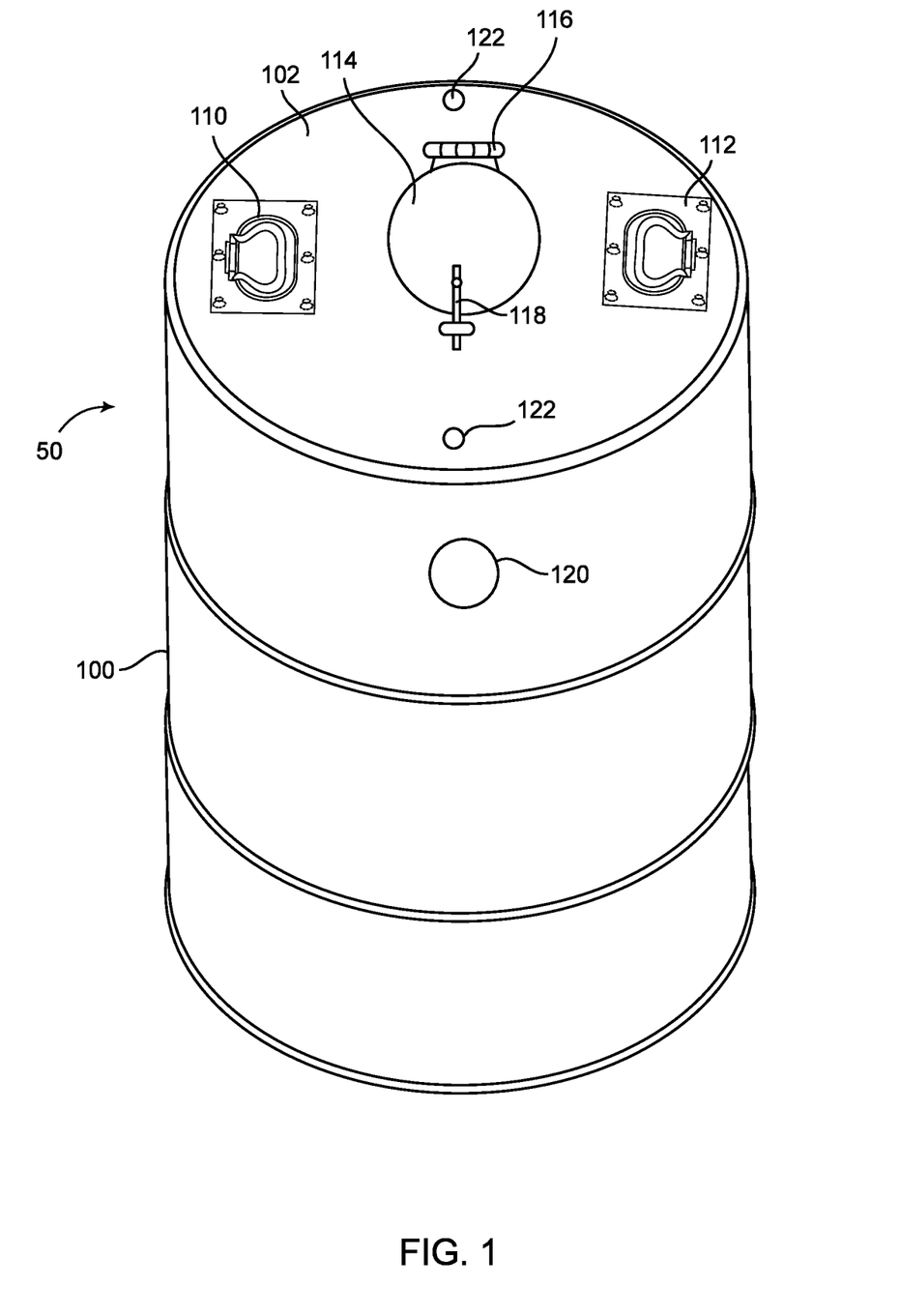
FIG. 1 is an oblique view taken of one embodiment of the uprightable barrel assembly.
Figure 2:
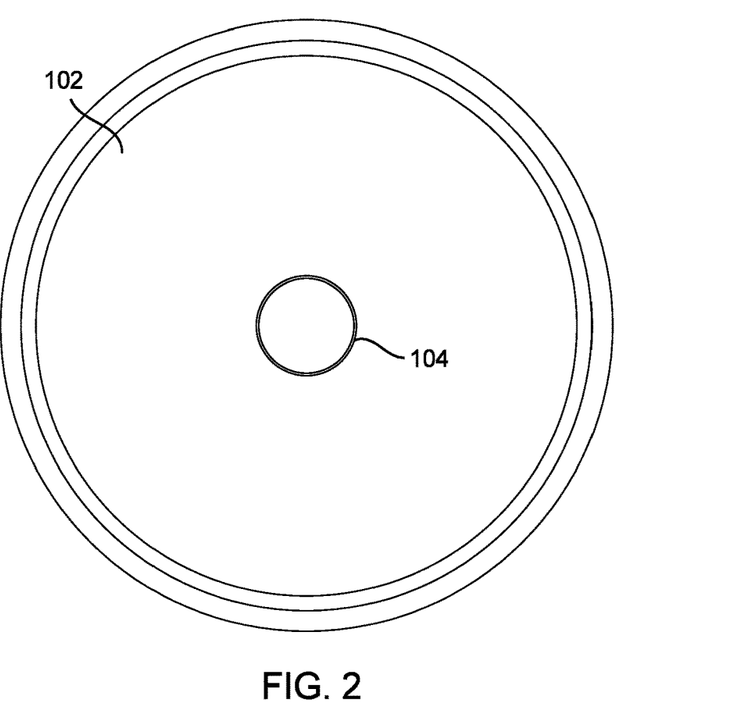
FIG. 2 is a top view of a barrel with a central opening.
Figure 3:
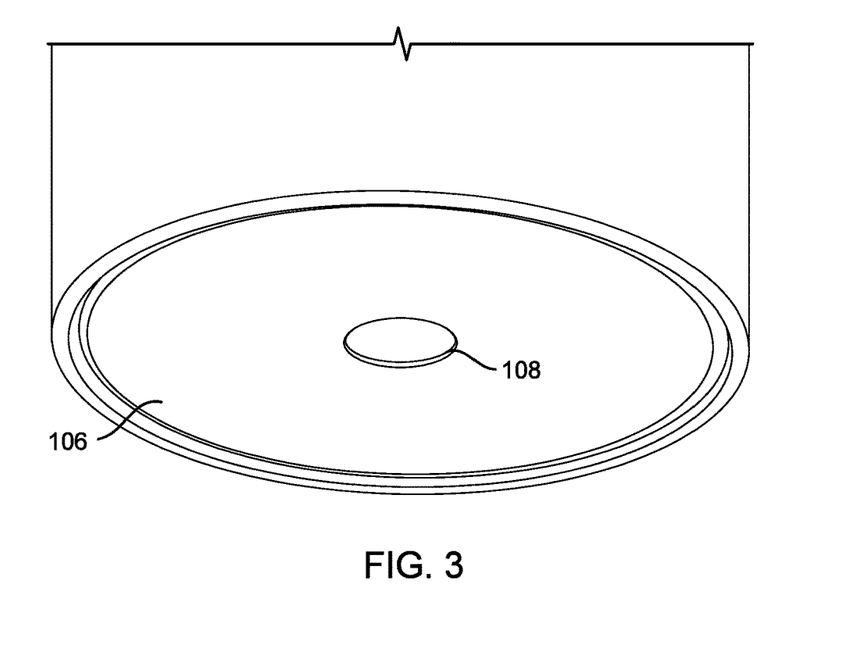
FIG. 3 is an oblique view of a bottom of a barrel with a central opening.

One embodiment of the barrel 100 is shown in FIG. 1. Preferably the barrel has the same shape and dimensions as regulation barrels but is made of plastic rather than metal. Plastic barrels are lighter and less likely to injure the horse or rider if they hit the barrel during practice. The top 102 of the barrel and the bottom of the barrel 106 have openings 104 and 108 respectively as illustrated in FIGS. 2 and 3. The openings are generally centralized within the top 102 and bottom 106 of the barrel and are large enough to reach a hand through the openings.

Preferred embodiments of the barrel have two handles 110, 112 mounted on opposed sides of the central top opening 104. The handles are positioned so that the barrel can easily be lifted by the handles and moved wherever and whenever desired. Since the barrel is typically made of plastic and is lighter than the regulation metal barrels, it is light enough for young or small persons to lift. The ability to move the barrels in and out of the practice area allows for any practice arena to serve multiple functions.

Preferably the top centralized opening 102 has a lid 114 that is used to close the top opening. Attaching the lid 114 to the top of the barrel allows the lid to be opened and closed over the top opening while preventing the lid from being misplaced during installation or removal of the barrel. The lid may be attached to the top 102 of the barrel in various ways known in the art. A preferred embodiment attaches the lid with a hinge 116. The lid 114 may also have a slidable latch 118 to secure the lid 114 whenever it is closed over the opening 102.

Figure 4:
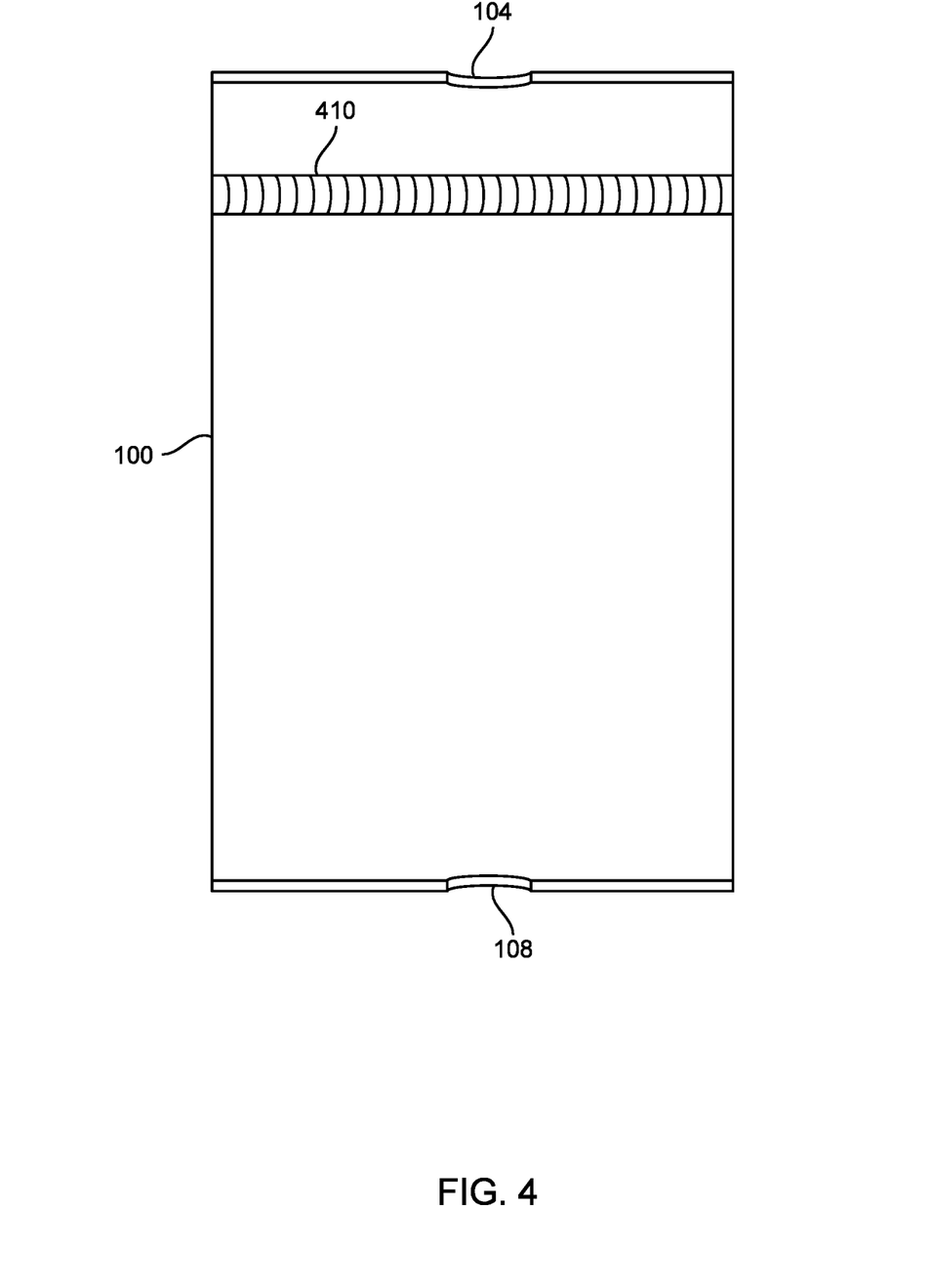
FIG. 4 is a side cross-sectional view of barrel with a cross-bar transversing the diameter of the barrel proximal the top opening.

The barrel 110 will include an internal attachment means for attaching an internal assembly 500 described below. Although the attachment means may take a number of configurations known in the art, a preferred embodiment of the attachment mechanism is a cross-bar 410, as shown in FIG. 4, that transverses the diameter of the barrel proximal to the top opening or within reach of the top opening. The cross-bar may be secured in place by a variety of mechanisms such as a bolt 122 running from the top of the barrel through the cross-bar on each side of the barrel and a nut to tighten the bolt into place. The ends of the cross-bar 410 are generally flush with the exterior of the barrel and may have a cap 120 over its outside ends in order to minimize injury to the rider or horse that may hit the barrel during practice sessions.

The Internal Assembly

Figure 5A:
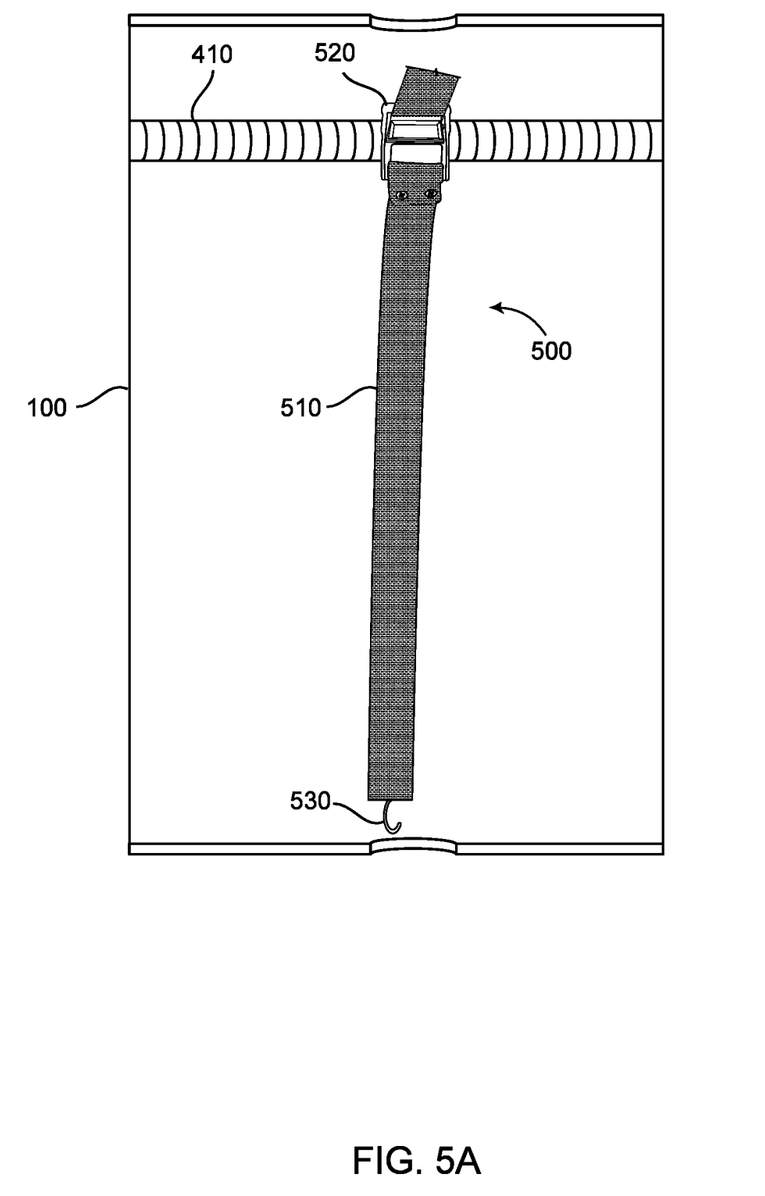
FIG. 5A is a cross-sectional view of the practice apparatus with one embodiment of an internal assembly mounted on the cross-bar.

The internal assembly 500 of the practice apparatus has an elastomeric section and a length adjustment mechanism. A first embodiment of the internal assembly 500 is shown in FIG. 5A. An elastomeric belt 510 is shown where a first end of the belt is looped around the cross-bar 410 or otherwise mounted thereon. An attachment mechanism 530 is shown attached to a second opposed end of the belt 510. A length adjustment mechanism 520 is shown proximal the first end of the belt close to the cross-bar. The adjustment mechanism 520 allows the length of the belt 510, or the distance between the cross-bar 410 and the attachment mechanism 530, to be adjusted. By adjusting the distance between the first end and the second end of the belt, one can adjust the distance that the internal assembly must be stretched to be tilted away from its vertical position and the tilting force required.

Figure 6:
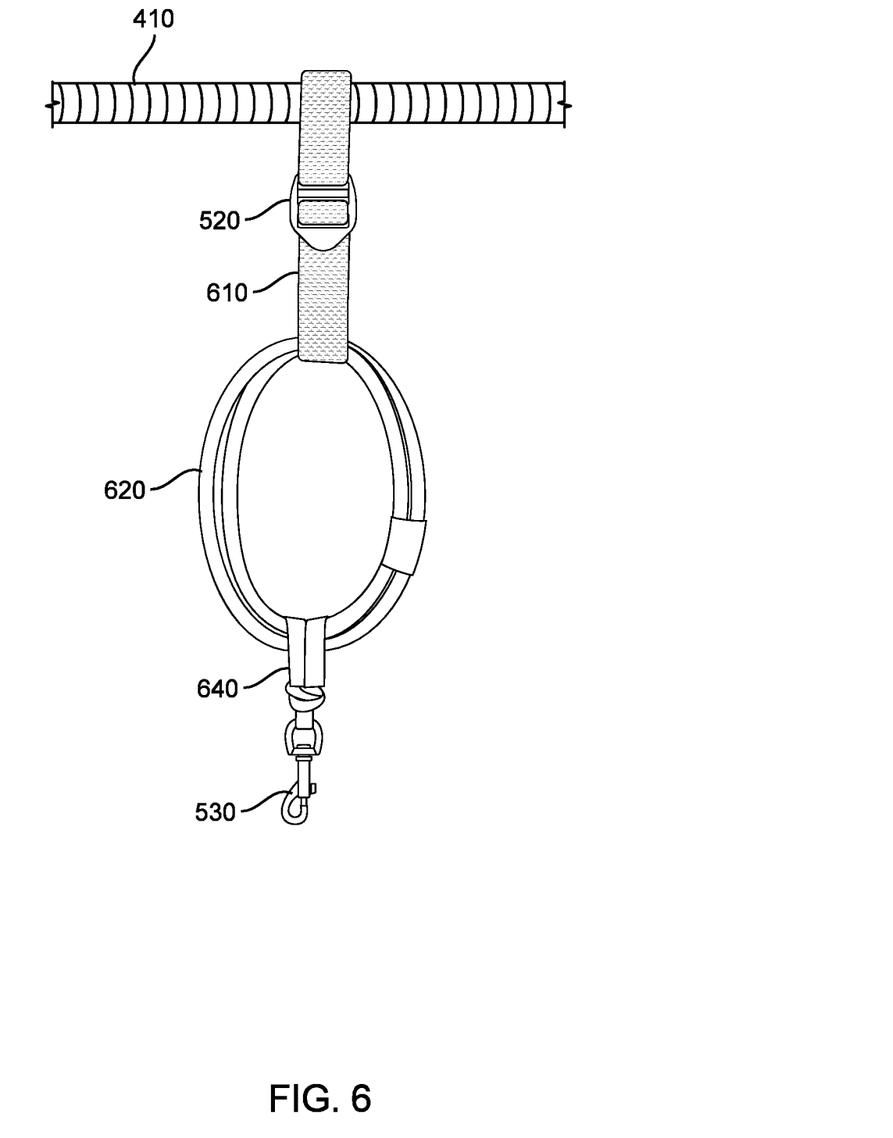
FIG. 6 is side view of a second embodiment of an interior assembly having a belt, a length adjustment mechanism, a stretchable section, and an attachment mechanism.

A second embodiment of an internal assembly is shown in FIG. 6. This embodiment includes a belt 610 that is preferably not elastomeric. The belt 610 has a length adjustment mechanism 520 attached to the belt for adjusting the length of the belt. Also attached to the belt, away from the point where the belt encircles the cross-bar, is a stretchable section 620. This stretchable section can take a number of configurations and can be made of a variety of types of elastomeric material. One embodiment of the stretchable section 620 illustrated in FIG. 6 is made of several loops of stretchable tubing 640. An attachment mechanism 530 is attached to the stretchable section 620 at the distal end of the stretchable section opposed to where the stretchable section is attached to the belt 610. Thus, a first end of the stretchable section 620 is attached to an end of the belt loop 610 away from the cross-bar as illustrated in FIG. 6 and an attachment mechanism 530 is mounted on a second end of the stretchable section 620.

The internal assembly 500 tethers the barrel to a ground device. The elastomeric material in the internal assembly allows for limited stretching of the internal assembly when the barrel is tilted when it is hit by a horse or its rider during practice. Once the force on the barrel is released, the tilted barrel is pulled back to its original vertical position by the retraction of the internal assembly to its original configuration.

The selected elasticity of the stretchable section governs its resistance to a distorting force. Therefore, the selection of the amount of elasticity present in the internal assembly in concert with the length of the internal assembly governs the degree of tilting that the barrel 100 can withstand, as well as the rapidity and force displayed by the uprighting of the barrel when the internal assembly retracts to its original configuration after the tilting force has been removed.

Figure 5B:
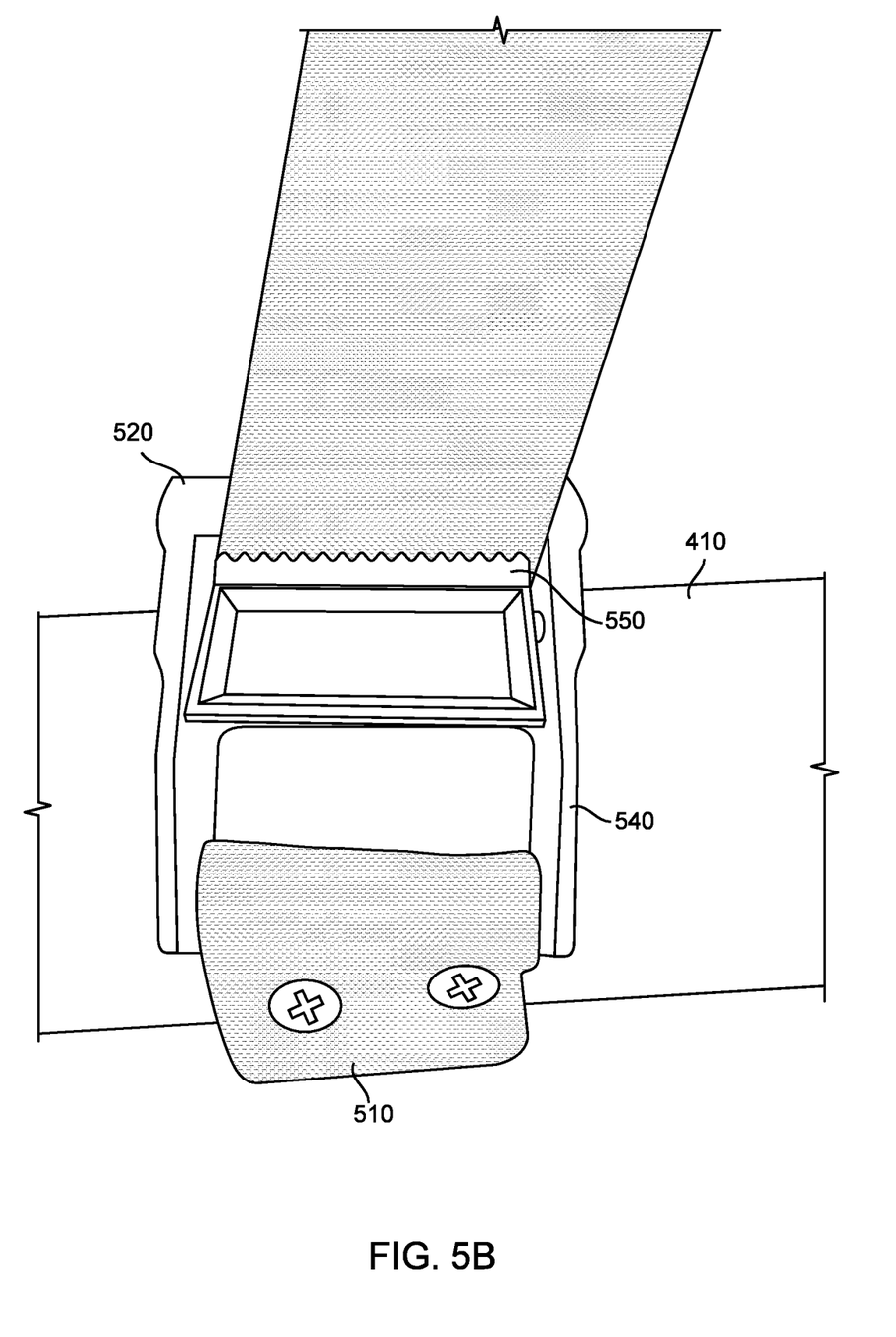
FIG. 5B is one embodiment of a length adjustment mechanism.

A variety of length adjustment mechanisms 520 well known in the art may be used to adjust the length of the belt or the distance from the cross-bar to the attachment mechanism. Such mechanisms include ordinary buckles, side release buckles, cam and spring buckles, clamps, clasps, and quick release strap adjusters used in seat belts and lifting harnesses. An example embodiment is shown in FIG. 5B.

Likewise a variety of attachment mechanisms 530 are know in the art that can selectably attach the internal assembly 500 to the ground assembly 600. Such mechanisms include slide hooks, snap hooks, carabiners, and clasps.

The weight of the internal assembly 500 and the attachment mechanism 530 will pull the bottom end of the internal assembly downward from the cross-bar whenever the interior assembly (e.g., the belt loop, the stretchable section, and the attachment mechanism) is positioned inside the barrel and allowed to freely fall downward from the cross-bar.

Whenever it is desired to have the attachment mechanism 530 accessible outside the bottom opening 108, the length adjustment mechanism 520 can be operated to increase the length of the belt loop until the interior assembly is long enough so that the clamp 530 is accessible outside the bottom opening of the barrel. For example, in the embodiment of the length adjustment mechanism shown in FIG. 5B, the quick release lever 550 is released and the belt slid through the buckle 540 to increase the length of the belt 510. Likewise, whenever it is desired to have the entire interior assembly inside the barrel 100, such as when the user wants to move the barrel, the quick release lever 550 is released and the loose belt end pulled through the buckle 540 to shorten the length of the belt 510 until the interior assembly is short enough so that the entire interior assembly fits within the barrel 100.

The Ground Assembly

Figure 7:
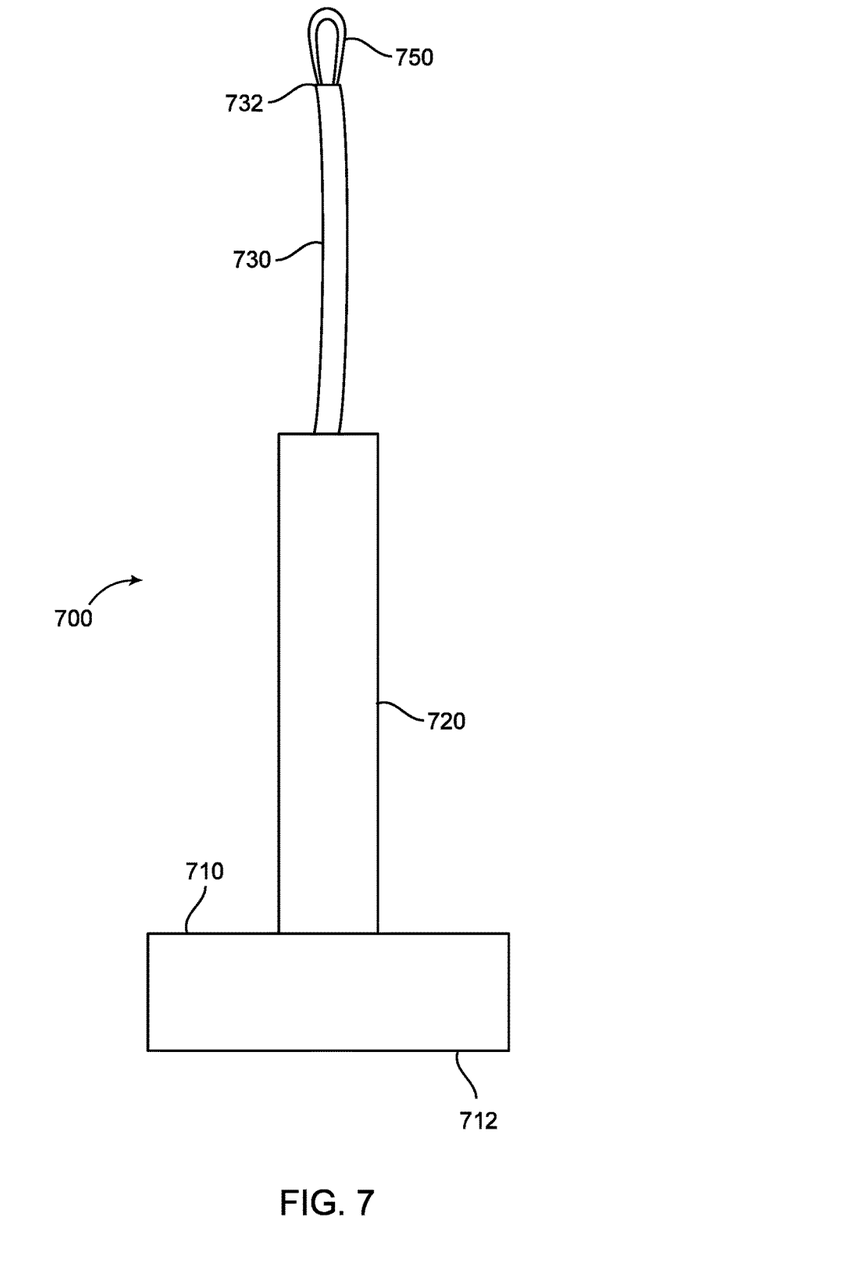
FIG. 7 is a side view of one embodiment of a ground assembly.

A ground assembly 700 includes an anchor section 710 and a flexible extension 730 with a terminal flexible loop 750. When assembled the anchor section is buried in the practice arena and the loop 750 attached at one end of the ground assembly protrudes outward from the ground. The section of the ground assembly that is buried in the practice arena is large enough and is buried deep enough to stabilize the ground assembly. The loop 750 that protrudes outwardly is flexible and is small enough that it does not interfere with other events that one may want to use the practice arena for. The loop 750 is also flexible enough that it does not interfere with mowing or raking the practice arena when the practice apparatus 50 is not in place.

One embodiment of the ground assembly 700 is shown in FIG. 7. The illustrated embodiment shows the anchor section 710 as a T-shaped pipe and the flexible extension 730 with a small flexible loop 750 extending therefrom. The T-shaped pipe is buried with the top 712 of the T buried the deepest and the stem 720 of the T facing upward. The flexible section is typically made of an elastomeric material and is attached to the stem of the T.

For example, one embodiment of a T-shaped anchor section 710 may include a T pipe connection, an extension tube, a flexible cord 730, and a terminal loop 750. The ground assembly 700 is generally buried a depth equal to the distance from a bottom side 612 of the T connection to the top end 732 of the flexible cord 730. Burying the anchor section of the ground assembly sufficiently far enough below the ground surface will stabilize the position and location of the ground assembly whenever the practice apparatus is connected to the ground assembly.

Installation/Removal of Barrel Assembly in Practice Arena

Before the barrel racing practice apparatus 50 can be installed in a practice arena, a ground assembly 700 must be placed at each of the desired locations for a practice apparatus. Typically a barrel racing practice arena will have three practice apparatuses placed in a triangular configuration. In order to place the ground assemblies in the arena, a hole is dug in the ground at each of the desired locations. The anchor section 710 of the ground assembly is set in the hole such that only the terminal loop 750 will stick out above the ground level.

For the embodiment of the ground assembly 700 shown in FIG. 7, the ground assembly is buried a depth equal to the distance from a bottom side 712 of the T connection to the top end 732 of the flexible cord 730. The anchor section of the ground assembly should be buried sufficiently far enough below the ground surface so that it will not interfere with working the ground of the arena when the barrel is not in place in the arena. Furthermore, it is important to sufficiently stabilize and immobilize the ground assemblies in the arena so that will not move when used during multiple practice sessions. If the ground assembly is sufficiently stabilized, the practice apparatus 50 will always be positioned in the same location within the arena each time it is attached to the loop 750.

Once the desired number of ground assemblies have been buried at the desired locations, a practice apparatus is placed close to each of the protruding flexible loops 750. The lid 114 of the barrel is opened so that a person can reach into the barrel to lengthen the internal assembly 500. When installing a practice apparatus 50, the installer will want to have the attachment mechanism 530 accessible outside the bottom opening 108. To lengthen the internal assembly the length adjustment mechanism 520 is operated to increase the length of the belt loop until the interior assembly is long enough so that the attachment mechanism 530 is accessible through the bottom opening of the barrel.

For example if the length adjustment mechanism is similar to the embodiment shown in FIG. 5B, the quick release lever 550 is released and the belt is pulled through the buckle 540 to increase the length of the belt 510 as it encircles the cross-bar. The weight of the internal assembly 500 and the attachment mechanism 530 will pull the bottom end of the internal assembly downward from the cross-bar toward the bottom opening.

The barrel is then tilted toward the horizontal and the person reaches in the bottom opening 108 and pulls the attachment mechanism 530 outside the bottom opening of the barrel and hooks it to the flexible loop 750 of the ground assembly 700. Once the attachment mechanism 530 is hooked to the flexible loop 750, the barrel is set upright into its vertical position. Then the person reaches into the barrel and selectably tightens the belt 510 until the slack in the belt is removed. The belt is further adjusted to be sufficiently taut, but not too taut, so that the elastomeric stretchable section can upright the barrel if it is tilted.

After use, the practice apparatus 50 can easily be removed from the practice arena so that it can be used for other purposes. The removal of the practice apparatus includes opening the lid 114 of the barrel so that a person can reach into the barrel to lengthen the belt 510 as it encircles the cross-bar 410. The belt 510 is loosened so that the barrel can be tilted or placed on its side with the attachment mechanism still outside of the bottom opening and attached to the ground device. Once the internal assembly is lengthened and the practice apparatus is tilted, the person reaches down and releases the attachment mechanism from the ground assembly 700. Once the attachment mechanism has been released, the practice apparatus is set upright. Then the person can reach in the top opening and selectably tighten the belt 510 to pull the attachment mechanism inside the barrel and the entire internal assembly inside the barrel. A person can then lift the barrel, using handles 110 and 112, to move the barrel to another location.

A variety of modifications to the practice apparatus 50 and the ground assembly 700 can be made without departing from the spirit of the invention.

What is claimed is:

1. A barrel racing practice apparatus having:
   a. a barrel having a top opening and an opposed bottom opening;
   b. a cross-bar that transverses a diameter of the barrel proximal the top opening;
   c. an attachment mechanism;
   d. an internal assembly connecting the cross-bar to the attachment mechanism, wherein the internal assembly includes a stretchable section and a non-stretchable belt;
   e. a length adjustment mechanism that selectably adjusts a length of the internal assembly; and
   f. a ground device having a portion anchored in the ground, wherein the attachment mechanism is selectably attachable through the bottom opening to the ground device.

2. The barrel racing practice apparatus of claim 1, wherein the ground device has a flexible section protruding outward from the ground that is selectably attachable to the attachment mechanism.

3. The barrel racing practice apparatus of claim 1, wherein the the length adjustment mechanism is incorporated into the non-stretchable belt.

4. The barrel racing practice apparatus of claim 3, wherein the non-stretchable belt is connected to the cross-bar.

5. The barrel racing practice apparatus of claim 3, wherein the stretchable section has a first end attached to the belt and a second end attached to the attachment mechanism.

6. The barrel racing practice apparatus of claim 3, wherein the length adjustment mechanism is a buckle secured to a first end of the belt with a second end of the belt passing through the buckle and held by a selectably releasable clasp.

7. The barrel racing practice apparatus of claim 1 having two handles attached to the top side of the barrel, wherein the two handles are positioned on opposed sides of the top opening.

8. A barrel racing practice apparatus comprising:
   a. a barrel having a top side with a top opening and a bottom side with a bottom opening;
   b. a cross-bar that transverses a diameter of the barrel proximal to the top opening; and
   c. an internal assembly having
      a belt reversibly mounted on the cross-bar with a length adjustment mechanism attached to the belt,
      a stretchable section attached at a first end to the belt, and
      an attachment mechanism attached to a second end of the stretchable section facing the bottom opening; and
   d. a ground device wherein the attachment mechanism is selectable attachable through the bottom opening of the barrel to the ground device.

9. The barrel racing practice apparatus of claim 8 further comprising two handles attached to the top side of the barrel, wherein the two handles are positioned on opposed sides of the top opening.

10. The barrel racing practice apparatus of claim 8, wherein the barrel has a selectably openable lid that covers the top opening when closed.

11. The barrel racing practice apparatus of claim 8, wherein the length adjustment mechanism is a buckle, wherein a first end of the belt is secured to the buckle and a second end of the belt passes through the buckle and is held by a selectably releasable clasp.

12. The barrel racing practice apparatus of claim 8, wherein the stretchable section is at least one loop of an elastomeric material.

13. The barrel racing practice apparatus of claim 8, wherein the length adjustment mechanism selectably adjusts a distance between the cross-bar and the attachment mechanism.

14. The barrel racing practice apparatus of claim 13, wherein the distance between the cross-bar and the attachment mechanism governs a tilting force necessary to tilt the practice apparatus a specific angle from a vertical position.

15. The barrel racing practice apparatus of claim 8 having an anchor portion of the ground device buried in the ground and a flexible portion protruding outward from the ground, wherein the attachment mechanism attached to the flexible portion of the ground device.

16. The barrel racing practice apparatus of claim 15, wherein the anchor portion is a T-shaped pipe buried with a stem of the T facing upward and a top of the T buried the deepest in the ground.

17. The barrel racing practice apparatus of claim 16, wherein the flexible portion of the ground device has a first end that is a flexible loop protruding outward from the ground and an opposed second end attached to the stem of the T.

* * * * *